Figure 1:
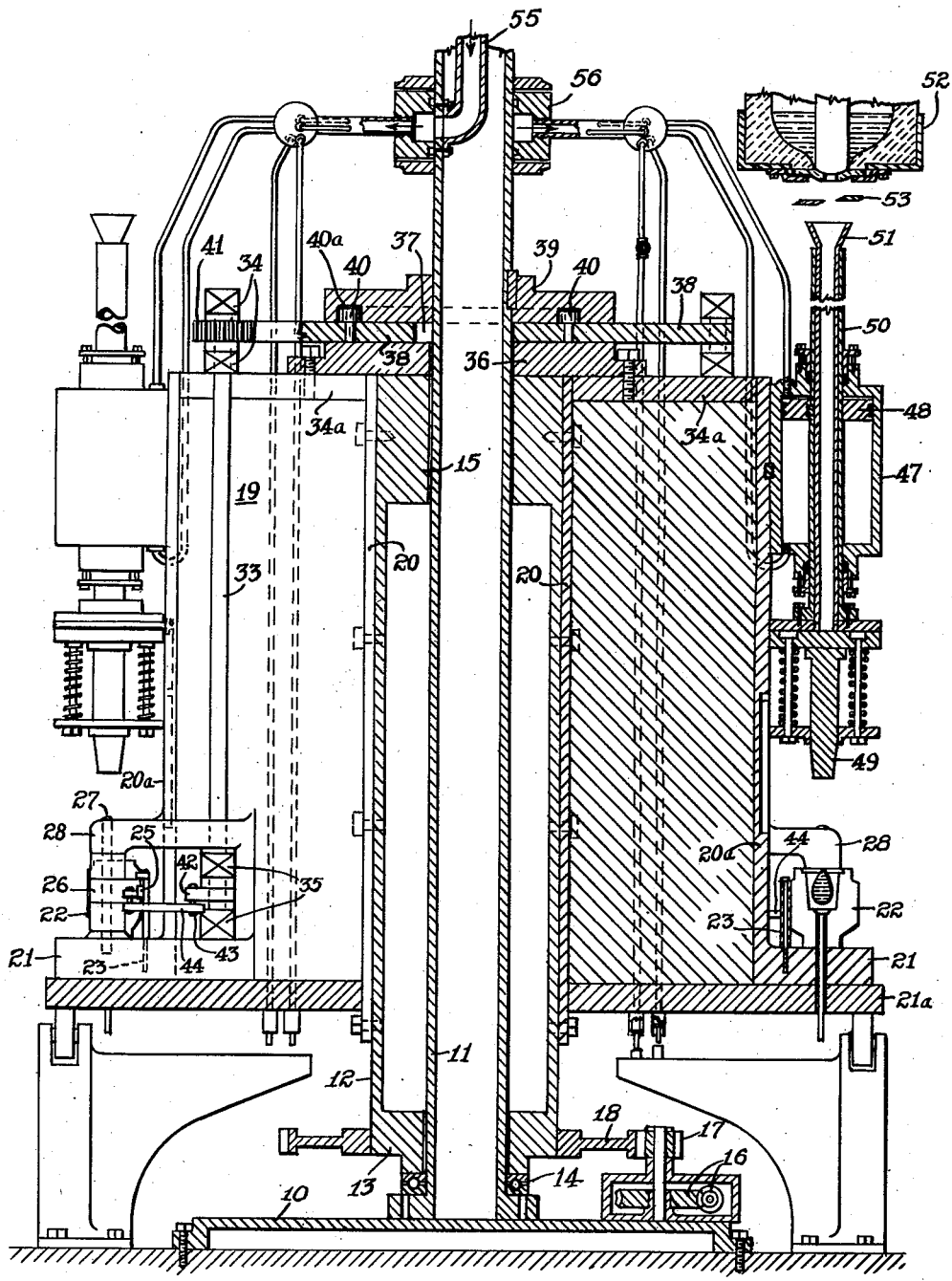

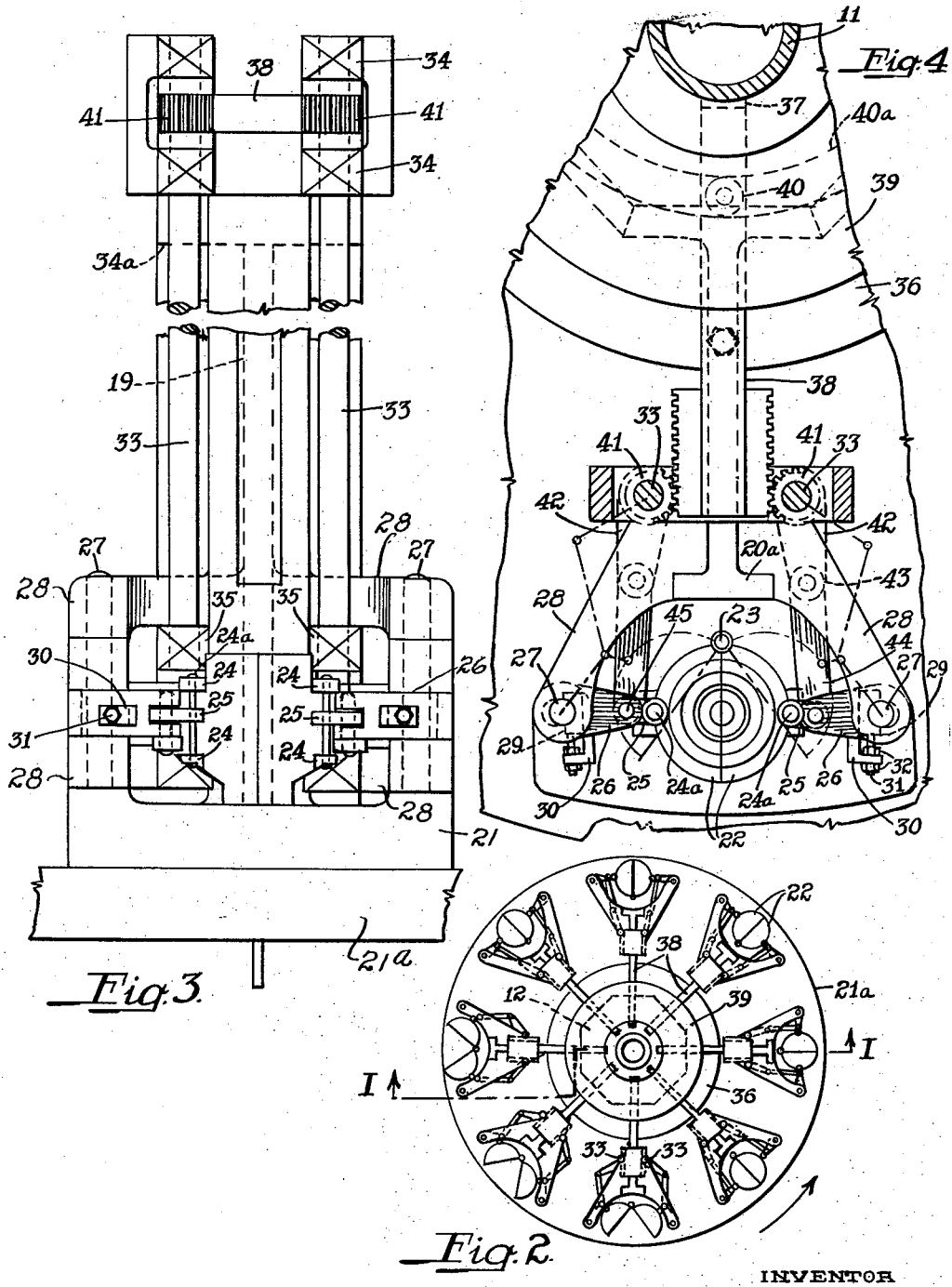

June 12, 1945.  S. D. BERT  2,378,176
GLASS FORMING MACHINE
Original Filed Feb. 8, 1940  3 Sheets-Sheet 3
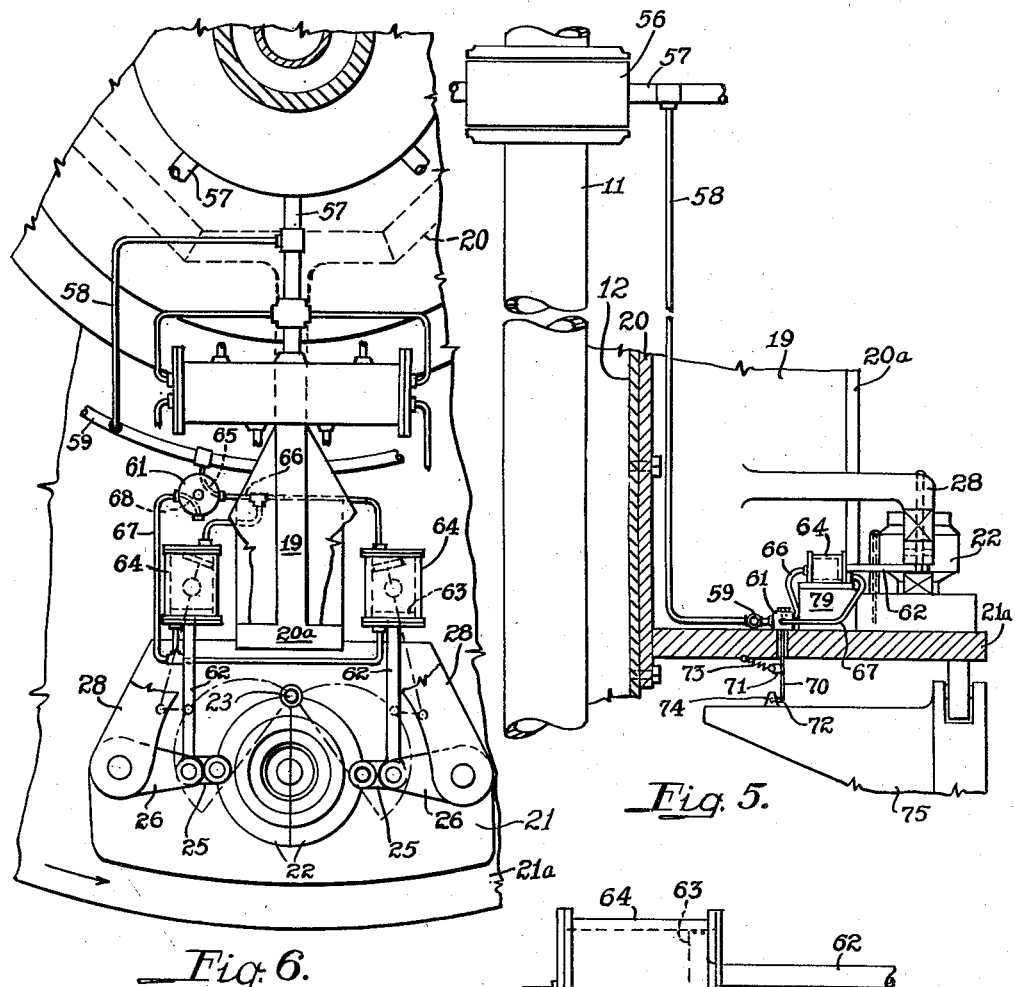
Fig. 5.
Fig. 6.
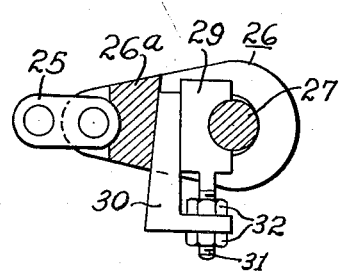
Fig. 9.
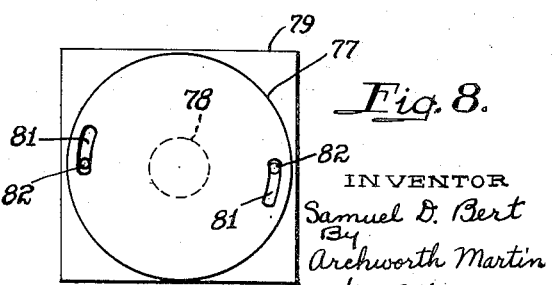
Fig. 7.
Fig. 8.
INVENTOR
Samuel D. Bert
By Archworth Martin
His Attorney Patented June 12, 1945

2,378,176

UNITED STATES PATENT OFFICE 2,378,176

GLASS FORMING MACHINE

Samuel D. Bert, Washington, Pa., assignor of one-third to Maurice A. Yorkin and one-third to James D. Martin, both of Washington, Pa.

Original application February 8, 1940, Serial No. 317,843. Divided and this application April 7, 1942, Serial No. 437,990

2 Claims. (Cl. 49—42)

This invention relates to glass forming machinery and more particularly to mechanism for opening and closing glass molds wherein is performed the shaping of charges of molten glass, to form articles of glassware, and is a division of my application Serial No. 317,843, filed February 8, 1940 (Patent No. 2,282,449).

One object of my invention is to provide an improved manner of operating hinged mold sections to open and close the same, whereby they may be closed very tightly and so held during glass-shaping operations, without the necessity of mold clamps.

Another object of my invention is to provide mold opening and closing mechanism of such form that the halves of a split mold are closed by thrust forces exerted in approximately diametral directions from opposite sides of the mold without any substantial opening and closing forces being transmitted to the hinge pin by which the mold halves are usually connected, thus avoiding wear and looseness at the hinge pin and consequently mismatching of the mold halves when they are closed.

Only so much of a glass forming machine is shown in the accompanying drawings and described in the following specification as will make clear the invention which is to be claimed in this divisional application, reference being had to my patent above named, for a more detailed description of the complete machine.

In the accompanying drawings, Figure 1 is an enlarged vertical sectional view through the machine, taken on the line I—I of Fig. 2; Fig. 2 is a plan view of the structure of Fig. 1, with certain of the parts omitted, showing the positions occupied by various of the mold members and their operating links, at different points in their path of travel; Fig. 3 is a face view, on an enlarged scale, of one of the molds of Fig. 1 and certain of its operating members; Fig. 4 is a sectional plan view of the structure of Fig. 3; Fig. 5 is an elevational view showing a modification of the mold-operating apparatus of Figs. 1 to 4; Fig. 6 is a plan view thereof; Fig. 7 is a view partly in elevation and partly in section, on an enlarged scale, of a portion of the apparatus of Figs. 5 and 6, Fig. 8 is a plan view thereof, and Fig. 9 is a sectional plan view of one of the link-adjusting devices of Fig. 4.

The apparatus comprises a base plate 10 to which is rigidly secured a central stationary column 11. A rotatable column 12 has an internal flange or rib 13 that is supported upon an antifriction bearing 14. At its upper end the column 12 has an internal rib 15 that serves as a bearing member for engagement with the column 11. The column 12 is octagonal on its peripheral surface, as shown in Fig. 2, and a presser unit is connected to each of the octagonal surfaces, as hereinafter explained. The column is driven from a suitable source of power through a worm gear unit 16, a pinion 17 and a ring gear 18 that is rigidly connected to the lower end of the column 12.

A mold-carrying arm or wing 19 is secured to each octagonal face of the column 12, such wings having vertically-extending flanges 20 that are connected to the octagonal faces by screws. Each wing 19 carries a vertically-extending face plate 20a, that at its lower end has a mold-supporting ledge or flange 21 for supporting a mold 22. An annular plate or mold table 21a is secured to the members 19 and 20a. The molds are formed in two sections that are hinged together, so that the mold halves can be opened and closed by linkage mechanism to be hereinafter described.

The mold halves are pivotally connected to the ledges 21, as indicated at 23, and each mold half has perforated ears 24 (Fig. 3) to which a short link 25 is pivotally connected by a pin 24a. The link 25 is in turn pivotally connected to a link 26, whose outer end is pivotally connected through a pin 27 to a pair of bracket arms 28 that are carried by the face plate 20a. The inner ends of the links 25 have direct thrust engagement with the mold halves, and their outer ends direct thrust with the links 26. The links 25 and 26 form a toggle for use in opening and closing the molds. The pin 27 has loose fit with the link 26, but a snug fit with the arms 28, so that the link can be adjusted longitudinally of itself, with respect to the pivot pin and the arms 28, to insure proper snug closing of the mold halves (see Fig. 4). A bearing block 29 (Figs. 4 and 9) is loosely positioned between each pair of arms 28 and is held in firm engagement with the pin 27 by a wedge block 30, which seats against a web 26a in the link 26 and is adjusted longitudinally of itself upon a screw stud 31 that is carried by the block 29 (Figs. 4 and 9), by the turning of a pair of nuts 32. It will be seen that if the mold halves are not snugly closed by the mechanism hereinafter described, the wedge 30 will be moved in slightly to shift the links 25 and 26 toward the axis of the mold, thereby insuring that the mold halves will be brought tightly together when the links 25 and 26 are moved into parallelism with one another.

The column 12 which carries the molds is constantly rotated and the molds 22 are periodically opened and closed by means of mechanism which will now be described. This mechanism comprises a pair of vertical shafts 33 for each of the molds, the shafts being journaled at their upper and lower ends in bearings 34 and 35 that are carried by the arms or wings 19, the upper bearings 34 being mounted on plates 34a that are secured to the upper edges of the wings 19, the shafts extending down opposite sides of each wing 19.

A collar 36 is secured to the column 12 so as to turn therewith and is provided with a series of radial slots 37 that serve as guide ways for rack bars 38. A collar 39 is keyed to the stationary column 11 and has a camming slot 40a for receiving camming lugs or rollers 40 which are carried by the rack bars 38, so that as the column 12 is rotated, these rack bars will be shifted radially. The rack bars near their outer ends engage with gear pinions 41 that are secured to the upper ends of the shafts 33, so that said shafts will be oscillated through radial shifting of the rack bars 38. At their lower ends the shafts 33 carry crank arms 42 that have pivotal connection at 43 with links 44, the links 44 being connected to pivot pins 45 that also connect the toggle links 25 and 26.

A cylinder 47 and a piston 48 for operating a pressing plunger 49 that shapes the glass within the mold, are mounted against each face plate 20a, near the upper end of the plate, in vertical alignment with the mold carried at the lower end of such plate. A metal tube 50 extends through each cylinder and is rigidly secured to the piston 48 and serves as a piston rod. The tube has a renewable liner 51 that is flared at its upper end to receive charges of glass from a furnace indicated diagrammatically at 52, the charges of glass being sheared by knives indicated at 53, in a manner well known in the art, the knives being operated each time a charging tube 50—51 reaches charging position. The charge of glass falls through the tube and thence into the mold, the pressing plunger 49 having first been swung to one side as explained in my said application, and as shown, for example, in Fig. 6 thereof. Thereafter the plunger is restored to operating position, to press the glass.

It will be seen that as the mold-carrying column 12 rotates, the rack bars will be oscillated to open and close the molds, as indicated in Fig. 2. Thus, when a rack bar has been drawn by the cam slot to its innermost position, the mold sections are closed, this position being occupied during the feeding of a charge of glass into the mold and during the shaping of the glass in the mold. When each mold unit approaches the station at which the shaped glass article is to be removed from the mold, the curvature of the cam slot is such that the rack bar will be forced outwardly to cause the crank arm 42 to be swung about its axis at 33, thus moving the arm and its associated link 44 to the broken line positions indicated in Fig. 4, thereby causing the links 44 to be drawn inwardly, thus breaking the toggle 25—26 and separating the mold halves. When the mold unit has passed this station, the rack bars will again be drawn inwardly to close the mold and make it ready to receive another charge of glass.

In Figs. 5 to 8 I show a manner in which the toggle mechanism for opening and closing the molds is pneumatically operated instead of being operated by the use of cams and rack bars as in Figs. 1 and 4. In this arrangement, air under pressure from a supply line 55 and a header ring 56 is supplied through one of the pipes 57 and through a pipe 58, to a header pipe 59. Rotary valves 61 have communication with the annular header pipe 59, a valve 61 being provided for each mold. The toggle links 25 and 26 are operated through reciprocation of the piston rods 62 to open and close the molds. The piston rods are provided with pistons 63 that are contained within cylinders 64.

When the valve 61 is in the position shown in Fig. 6, air will flow through its port 65 and a pipe 66 to the rear ends of the cylinders 64, thus forcing the pistons 63 forwardly and straightening the toggle links 25—26 to close the mold sections. Exhaust from the front sides of the pistons takes place through a pipe 67 and valve port 68. When the valve 61 is in its opposite position, the port 65 will be brought into registry with the line 59 and the pipe 67, to admit fluid pressure to the front sides of the pistons and thereby effect opening of the mold sections. Exhaust at this time occurs from the rear side of the pistons through pipe 66 and port 68. Liquid pressure may be used instead of air pressure. The valve 61 is periodically operated during movement of the mold carrier, by its stem 70 that extends downwardly and has a pair of laterally-extending arms 71 and 72 which function as crank arms to effect rotative movements of the valve. The valve is normally held by a spring 73 in the position shown in Fig. 6, at which position the mold 22 is closed. A camming rail 74 is positioned on brackets 75 and extends beneath the zone in which the molds are to be in their opened positions (Fig. 2) and it will be engaged by the arm 72, so as to cause the valve 61 to be rotated into position that fluid pressure will flow through the port 65 to the front sides of the pistons 63, to effect opening of the molds. After the ware has been removed from a mold, the arm 72 will pass out of engagement with the cam rail 74, thus allowing the spring 73 to return the valve to its former position and to effect closing of the molds preparatory to receiving another charge of glass.

In order to prevent binding of the pistons and piston rods in their respective cylinders, because of the slight arcuate movement of the piston rods, which occurs through operation of the toggle mechanisms, I secure each cylinder to a base plate 77 that has a circular boss 78 fitting within a recess in a block 79 that is secured to the mold table 21a. The plate 77 has arcuate slots 81 through which screws 82 extend and have threaded engagement with the block 79. The screws 82 are not turned down tightly, so the cylinder 64 with its base plate 77 can have slight swiveling movement on the block 79 during operation of the toggle mechanism. The pipes 66 and 67 are of rubber hose, so that they will flex slightly, to permit of said movement.

While I have more particularly described apparatus for performing pressing operations on glass, it will be understood that the mold mechanism can be incorporated in a machine that contains also blow heads for expanding charges of glass in molds, after they have been preliminarily shaped through a pressing operation, such machines commonly being known as press-and-blow machines, and widely used in the glass industry.

I claim as my invention:

1. A glass-forming machine comprising a rotatable mold carrier, molds each composed of half sections relatively movable on the carrier, toggle link mechanism having inner and outer links for opening and closing the sections of each mold, the inner link of each toggle being pivotally connected to a side of a mold section and having direct thrust engagement therewith and with the outer link, a bracket fixed on the carrier and having pivotal connection with the outermost end of each outer toggle link, a pair of members respectively having pivotal connections with the interconnected ends of each pair of toggle links, means operable during movement of the carrier for shifting each of said members transversely of the links, to make and break the toggle joint, to thereby effect opening and closing movements of the mold sections, and a wedge-like adjustable connection between said outermost end of each outer link and the adjacent bracket, whereby the toggle links may be adjusted toward and from the center of the mold.

2. Glass-forming apparatus comprising a mold composed of relatively movable half sections, toggle link mechanisms each having inner and outer links, connected to the half sections and to a fixed point, at opposite sides of the mold, means operable to shift the connected ends of each pair of links into and out of alinement with the point of connection to the mold and the said fixed point, a pivot pin for supporting each outer link at its said fixed point and having lost-motion connection with the link, a bearing block partly embracing the pin, a thrust shoulder on the last-named link, a wedge positioned between the bearing block and the shoulder, and a screw threaded adjusting device interconnecting the wedge and the bearing block, arranged to shift the wedge in a direction to push the links toward the mold and thus compensate for wear at the toggle links.

SAMUEL D. BERT.